United States Patent [19]

Hudson

[11] Patent Number: 4,633,455
[45] Date of Patent: Dec. 30, 1986

[54] HEADWHEEL FOR A MULTIPLE BEAM OPTICAL TAPE PLAYBACK SYSTEM

[75] Inventor: Kenneth C. Hudson, Philadelphia, Pa.

[73] Assignee: RCA Corporation, Princeton, N.J.

[21] Appl. No.: 715,404

[22] Filed: Mar. 25, 1985

[51] Int. Cl.[4] .............................................. G11B 7/135
[52] U.S. Cl. ...................... 369/45; 369/97; 369/112; 360/114
[58] Field of Search ................ 369/13, 14, 15, 44, 369/45, 46, 100, 110, 112, 97, 111, 109; 360/114; 358/204, 206, 290, 345, 347; 346/76 L, 108

[56] References Cited

U.S. PATENT DOCUMENTS

| | | | |
|---|---|---|---|
| 3,314,075 | 4/1967 | Becker et al. | 369/97 |
| 3,600,507 | 8/1971 | Newgard . | |
| 3,770,910 | 11/1973 | Rose et al. | 369/112 |
| 3,823,276 | 7/1974 | Maslowski et al. | 369/97 |
| 3,969,765 | 7/1976 | Roos | 360/59 |
| 4,416,001 | 11/1983 | Ackerman et al. | 369/97 |
| 4,459,690 | 7/1984 | Corsover et al. | 369/44 |
| 4,479,051 | 10/1984 | Musha | 250/202 |
| 4,525,828 | 6/1985 | Higashiyama et al. | 369/112 |

FOREIGN PATENT DOCUMENTS

0699560 10/1979 U.S.S.R. ............... 369/112

OTHER PUBLICATIONS

Juliana, Jr., "Rotating Head Magneto-Optic Station", IBM Tech. Disc. Bul., vol. 15, No. 6, Nov. 1972, pp. 1790–1791.

Wai-Hon Lee, "High Efficiency Multiple Beam Gratings," Applied Optics, vol. 18, No. 13, Jul. 1, 1979, pp. 2152–2158.

*Primary Examiner*—Donald McElheny, Jr.
*Attorney, Agent, or Firm*—J. S. Tripoli; R. L. Troike; C. L. Maginniss

[57] ABSTRACT

A multiple track playback headwheel is disclosed for use in a helical scan optical tape recording system. The headwheel includes optical diffraction gratings at the center of rotation of the headwheel positioned normal to the rotational axis. A collimated light beam supplied from a laser external to the headwheel, directed along the rotational axis of the headwheel, is split into a plurality of beams by the gratings. The plurality of beams are imaged at the entrance pupil of the playback objective lens which focuses the beams to diffraction limited spots on the surface of an optical tape having information recorded thereon. The illuminated spots are reflected back through the objective lens and are formed into beams which are directed to an information and tracking detecting apparatus and to a focus detecting apparatus.

18 Claims, 4 Drawing Figures

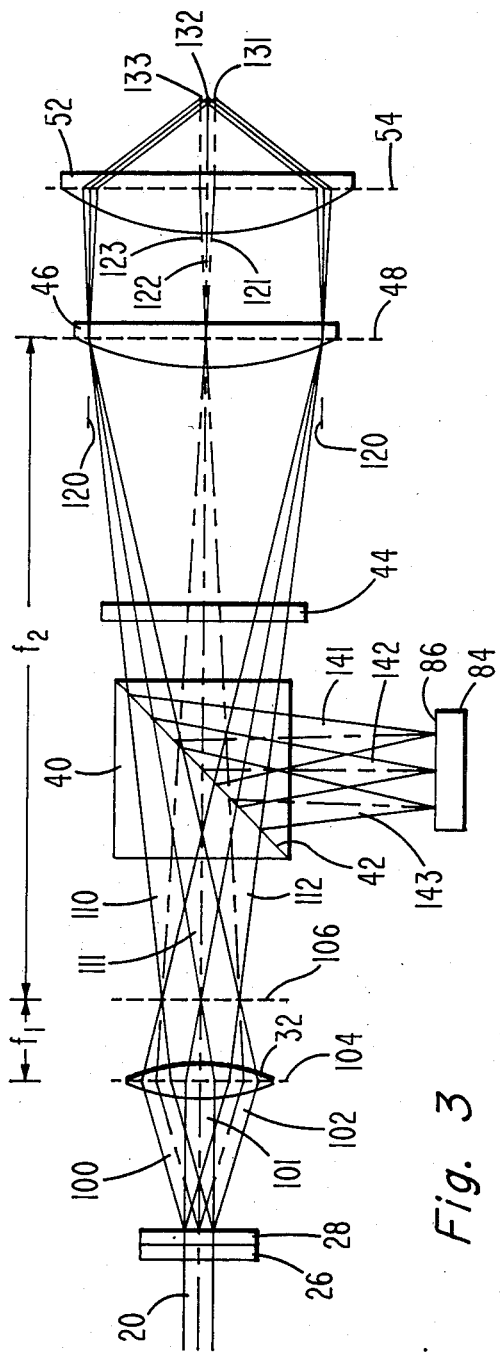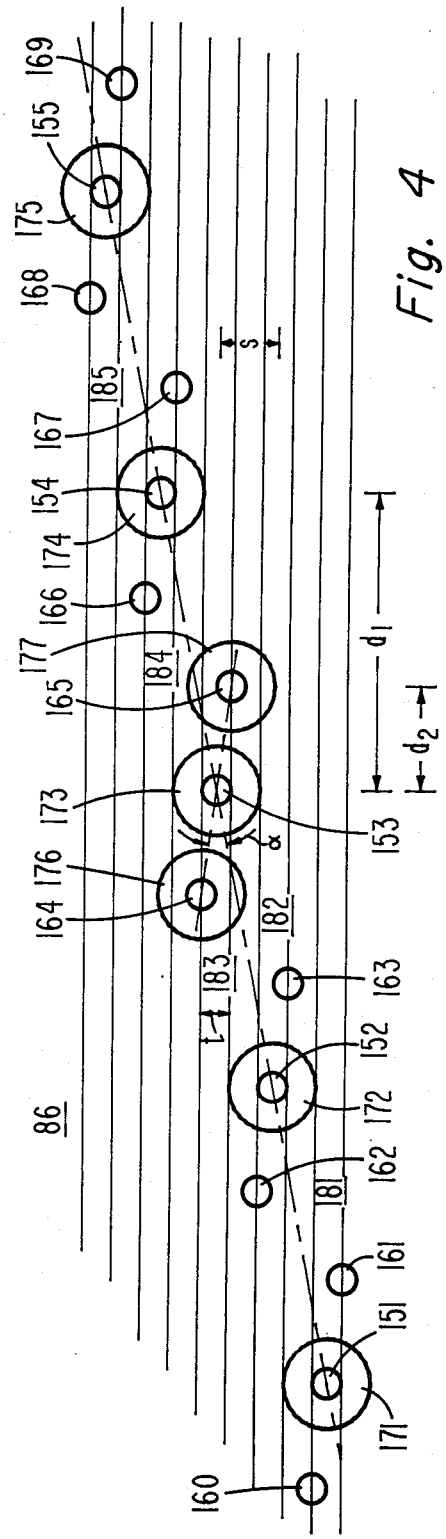

HEADWHEEL FOR A MULTIPLE BEAM OPTICAL TAPE PLAYBACK SYSTEM

The U.S. Government has rights in this invention pursuant to a Government contract.

This invention relates generally to optical tape playback systems and, more particularly, to a headwheel including an optical system for receiving a light beam from an external source and generating a plurality of playback beams therefrom for illuminating and detecting information recorded on an optical tape.

BACKGROUND OF THE INVENTION

In recent years there has occurred a combining of the magnetic tape recording and optical disc recording arts resulting in the evolution of high density recording on light and thermal sensitive optical tapes using techniques analogous to helical scan magnetic tape recordings. Optical tape media using magneto-optic and reversible crystalline state techniques for erasable recordings, as well as ablative techniques for permanent or archival recordings, are in current use and development.

The combination of the two arts has derived the benefit of the extremely high data packing density and, in the case of ablative recording, permanent storage of data information from the optical recording art, and the extensive recording surface and increased portability of the recording system and storage media from the magnetic tape recording art. An optical tape recording system is particularly well suited for tactical applications where information is to be recorded at field sites and the storage media returned to a base station for playback and processing of the recorded information.

Multiple channel recording and playback techniques are used in both magnetic tape and optical disc systems for greatly increased data transfer rate capability. Therefore, it is apparent that this advantage would apply also to optical tape recording and playback systems. In optical storage systems there are typically two different methods of forming the multiple beams used for recording and playback. In one method, a single laser produces a beam which is split into a plurality of beams by, for example, an optical diffraction grating or an acousto-optic beam splitter. The acousto-optic device is particularly well suited for recording, as the beams may be individually modulated by the beam splitter. In the second method, an array of semiconductor laser diodes produces a plurality of beams which may be driven by independent sources.

An optical tape recording headwheel may ideally use a laser diode array for generating record beams. A typical record headwheel, having a five-inch diameter, will accommodate an array of five or more laser diodes, collector lens, beam shaping optical elements, objective lens and focus subsystem. Thus, the headwheel is relatively lightweight and has low power requirements. However, since the diode array occupies a significant fraction of the volume of the headwheel, there is not sufficient space to include the additional elements needed for playback within the record headwheel. Thus, a different headwheel for use in playing back the data recorded on an optical tape is proposed.

It is advantageous to use a beam produced by a gas or ion type continuous wave laser for playing back data recorded on an optical tape, as the smaller wavelength beam from an argon or helium-neon laser can be focused to a smaller spot than can the beam from a semiconductor laser. In this way the tracks of recorded data can be placed much closer together and the packing density increased, since the shorter wavelength of the playback laser beam reduces cross-talk between tracks and inter-symbol interference along each track.

Because of its size, a gas or ion laser cannot be located on a rotating headwheel. It would be necessary therefore, to direct a laser beam from a stationary position onto the rotating playback headwheel such that a playback objective lens illuminates the optical tape forming a helix around the rotating headwheel. However, if multiple beams are generated from a stationary location onto the headwheel, the beams would rotate about the optical axis of the playback lens and would be unable to properly illuminate the data information recorded on the tape.

SUMMARY OF THE INVENTION

In accordance with the principles of the present invention, a headwheel is disclosed for use in a system for retrieving information stored on an information-bearing surface of an optical tape. The headwheel comprises support means having a generally cylindrical outer surface and being rotatable about a central axis. The optical tape is helically wrapped around a portion of the support means such that the information-bearing surface is adjacent the outer surface. The headwheel also includes means responsive to a collimated beam of light directed along the central axis for splitting the beam into a plurality of light beams and means for directing the plurality of beams into respective diffraction limited spots on the information-bearing surface of the optical tape. The headwheel further includes means for detecting the intensity of light reflected from the diffraction limited spots on the information-bearing surface.

BRIEF DESCRIPTION OF THE DRAWINGS

FIG. 3 is a diagram showing in greater detail the beam paths of the apparatus of FIG. 1; and FIG. 4 is a diagram showing the optical spot arrangement in accordance with the present invention.

DETAILED DESCRIPTION OF THE PREFERRED EMBODIMENT

In an optical data storage system, information can be recorded by exposure of a portion of an optical recording medium to a recording light beam, thereby changing the local optical properties of the exposed portion. One such recording medium is a layer of a light absorptive material overlying a substrate wherein information is recorded by locally melting or ablating the absorptive layer to form a pit therein. The presence of the pit may result in a change in the local reflectivity of the recording medium, which is detected during playback of the information.

The playback process consists of illuminating the recorded surface with a focused beam of light at a constant intensity sufficiently below the level used for recording so that no further changes occur in the absorbtive material, and detecting the light reflected from the surface of the medium. The intensity of light falling upon the detector alternates between maximum and minimum levels as the successive pit and undisturbed surface regions of the information track pass through the path of the focused beam.

Figure 1:
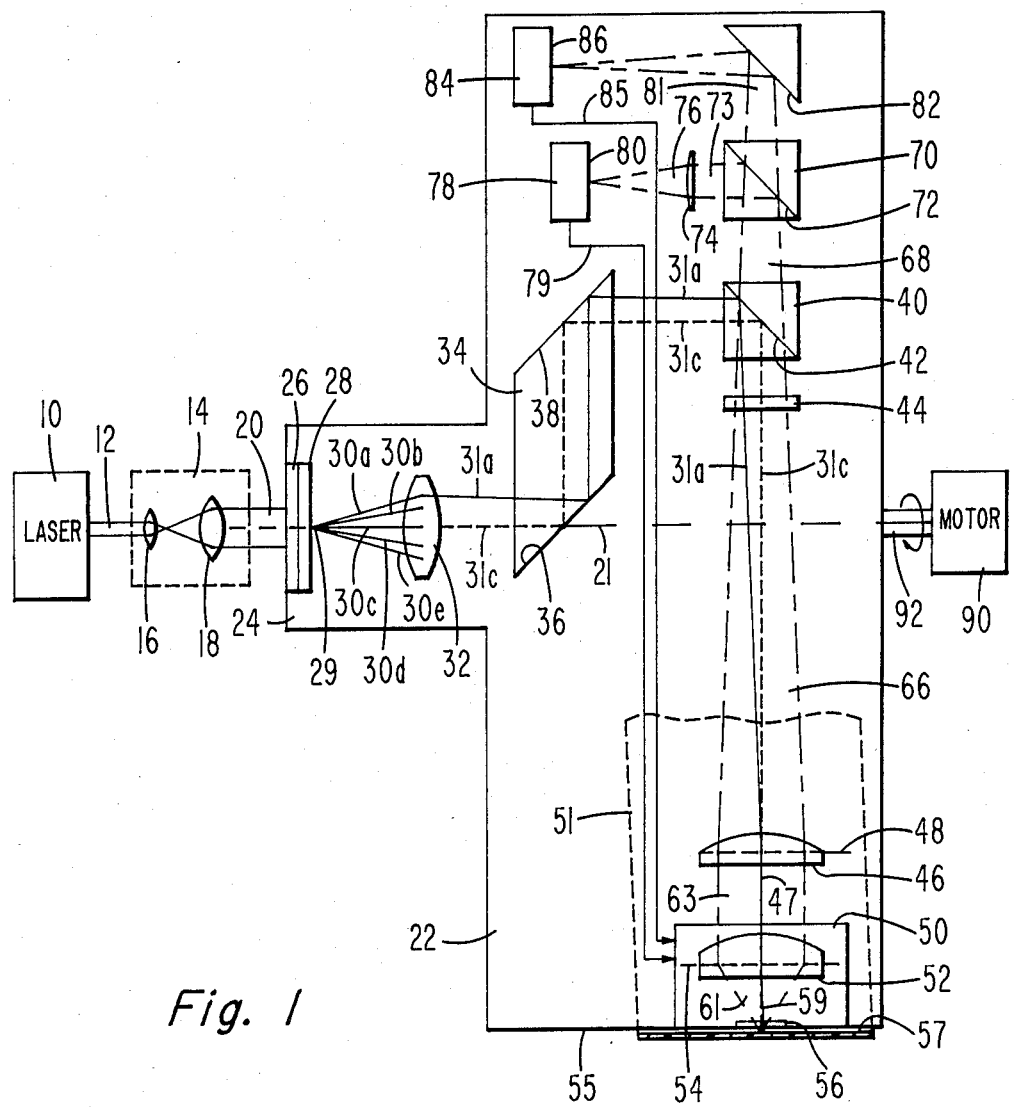
FIG. 1 illustrates a multiple-beam optical tape playback headwheel apparatus in accordance with the principles of the present invention.

Referring to FIG. 1, an optical tape playback system is shown in which laser 10 provides a narrow collimated beam of light 12. Laser 10 may typically be of the helium-neon (HeNe) type, having a light output with wavelength 633 nonometers (nm), or it may be of the argon type, having a light output with wavelength at either 488 nm (blue light) or 514 nm (green light). Collimated beam 12, which may typically have a diameter measured between its $1/e^2$ intensity points of 0.6 to 1.2 mm, is applied to beam expander 14. Beam expander 14 receives a small diameter collimated beam 12 at its input lens 16 and provides an expanded collimated beam 20 from its output lens 18. Beam 20 may typically have a diameter of 2 to 3 mm at its $1/e^2$ intensity points. It is necessary to expand the output beam of laser 10 in order to ensure a sufficiently wide beam that will always be directed along the central axis 21 of headwheel 22 in spite of small amounts of displacement caused by wobble during rotation.

Playback headwheel 22 is rotated about its central axis 21 by drive motor 90 which may be coupled via shaft 92. Alternatively, headwheel 22 may be rotated by a friction drive along a circumferential surface 55. Headwheel 22 has a typical rotational speed of 600 revolutions per minute.

Playback headwheel 22 includes grating holder 24 which maintains optical diffraction gratings 26 and 28 fixed in position at the center of rotation 21 and normal to it. The use of optical diffraction gratings to produce multiple beams from a single input beam is well known and is discussed in U.S. Pat. No. 4,459,690, "Multi-Beam Optical Record and Playback Apparatus Having an Improved Beam Splitter," issued July 10, 1984, to S. L. Corsover et al.

Figure 2:
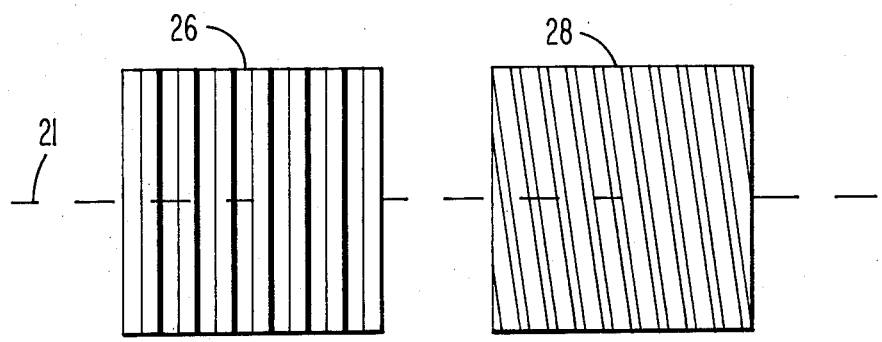
FIG. 2 is a diagram showing the relative positions of the optical diffraction gratings of the apparatus of FIG. 1.

The relative positioning of optical diffraction gratings 26 and 28 is shown in FIG. 2 in plan view but with the two devices laterally displaced. In one embodiment of the present invention, optical grating 26 splits a single incoming beam into five beams of substantially equal intensity. In this embodiment optical grating 28 splits each incoming beam into three beams wherein the central beam is of greater intensity than the side beams. The quantitive aspects of the fabrication of optical gratings for use in beam splitting is discussed in detail in "High Efficiency Multiple Beam Gratings," by Wai-Hon Lee, in Applied Optics, Vol. 18, No. 13, July 1, 1979, pp. 2152-2158. There is no intent to represent the relative widths of the grating lines and the spacings therebetween in gratings 26 and 28 as shown in FIG. 2 as being productive of the beam patterns described therefor. The diffraction lines of grating 28 are shown as at an angle of approximately 6° from those of grating 26. This relative positioning will be understood from a later discussion.

Referring back to FIG. 1, five beams, 30a-e are shown emerging from the stacked pair of optical diffraction gratings 26 and 28. The five beams correspond to the principal rays of the beams out of grating 26 wherein beam 30c is the 0 order beam, beams 30b and 30d are the +1 and −1 order beams, respectively, and beams 30a and 30e are the +2 and −2 order beams, respectively. The further splitting of each of the five beams by grating 28 is not shown, but it will be understood that each of the beams 30a-e represents three beams, wherein the 0 order beam from grating 28 is shown while the +1 and −1 order beams are not shown.

The fifteen beams, represented by beams 30a-e, emerge from grating 28 at point 29 and impinge on field lens 32. Lens 32 may be a simple lens, having a focal length of 14 mm, for example, used to direct the beams from diffraction grating 28 toward lens 46 further along the optical path. From this point in the description of FIG. 1, for ease of understanding, the fifteen illuminating beams between lens 32 and surface 57 of optical tape 51 will be represented by principal ray 31a (solid line) and principal ray 31c (dashed line).

The beams represented by principal rays 31a and 31c are directed onto a reflective surface 36 of an optically transmissive material 34, often referred to as a rhomb. They are then directed against reflective surface 38, where they emerge displaced from but parallel to their point of entry into rhomb 34. The beams represented by principal rays 31a and 31c from rhomb 34 are directed against surface 42 of polarizing beam splitter 40 where they are entirely reflected. Rays 31a and 31c pass through quarter-wave polarizing plate 44 and into tube lens 46 where they are imaged at principal plane 48.

The purpose of lens 32 is to direct all of the diffracted beams 30a-e toward tube lens 46 so that they are all centered on lens 46, and to expand beams 30a-e such that they completely fill the pupil of lens 46 at their $1/e^2$ intensity diameters. The beams having principal rays 47 which emerge from tube lens 48 are collimated and slightly divergent from each other. Beams 47 are imaged at a principal plane 54 of playback objective lens 52 which is positioned by focus/tracking actuator 50. Lens 52 focuses the beams having principal rays 59 through an optically transparent window 56 at the circumferential surface 55 of playback headwheel 22 into diffraction limited spots on surface 57, which is the optically sensitive surface of a tape 51 having optically readable information recorded thereon. Window 56 may typically be made of sapphire. As headwheel 22 rotates, hydrodynamic and/or hydrostatic forces cause optical tape 51 to "fly" away from circumferential surface 55, at a distance of, for example, several micrometers.

Focus/tracking actuator 50 is a device well known in the art and is described in U.S. Pat. No. 4,479,051, "Apparatus for Driving Objective Lens in Tracking Direction," issued Oct. 23, 1984, to T. Musha. Actuator 50 is responsive to a focus control signal generated by focus detector 78 on lead 79 for moving lens 52 along a first axis, toward or away from surface 57. Actuator 50 is additionally responsive to a tracking control signal generated by detector 84 on lead 85 for moving lens 56 along a second axis, orthogonal to the first axis, laterally in a plane parallel to surface 57.

The spots on surface 57 illuminated by the beams having principal rays 59 are reflected from surface 57 to an extent determined by the informational content at the spots. From this point in the description of FIG. 1, and for the balance thereof, only one beam will be described, namely, the 0 order beam, and it will be represented by its rays at its $1/e^2$ intensity, using lines of alternating long and short dashes.

Reflected beam 61 is collected by playback objective lens 52 where it is collimated. Collimated beam 63 is applied to tube lens 46 which provides beam 66 having a distant focal point. Beam 66 passes through polarizing quarter-wave plate 44 so that the beam striking surface 42 of polarizing beam splitter 40 is polarized 90° to the plane polarization of the incident beams 31a and 31c which were reflected by surface 42. Therefore, beam 66 passes through beam splitter 40 without reflection and becomes beam 68. Beam 68 strikes surface 72 of partial beam splitter 70 where a small fraction is reflected as beam 73 while the greater part passes through as beam 81.

The cross-sectional shape of beam 73 is altered by anamorphic lens 74, typically a cylindrical lens, such that, during the out-of-focus condition, an elongated spot is focused on surface 80 of quad cell detector 78 which functions as an astigmatic focus detector in a manner well known in the art. The output of focus detector 78 is converted to a control signal on lead 79 which causes focus/tracking actuator 50 to adjust the distance between objective lens 52 and surface 57 in accordance with optimum focus conditions.

Beam 81 is reflected by mirrored surface 82 onto surface 86 of detector array 84. Detector array 84 includes five detectors aligned to receive the light from the five data information beams generated out of grating 26 and passing through grating 28 as its 0 order beams. In addition, detector array 84 includes two detectors aligned to detect the light from the +1 and −1 order beams generated by grating 28 from just one of the five beams generated by grating 26. The latter pair of beams, which in the present example are associated with the central (0 order) beam from grating 26, provide a tracking control signal on lead 85 which causes focus/tracking actuator 50 to adjust the lateral position of objective lens 52 in accordance with optimum tracking conditions.

Referring now to FIG. 3, there is shown a diagram of the relevant beam paths within the playback headwheel 22 of the present invention. For purposes of clarity, FIG. 2 includes three unfolded beam paths each including a central ray (dashed lines) and outer rays (solid lines) at the $1/e^2$ intensity diameter. The three beams depicted herein may be considered either three data information illuminating and reflecting beams, for example, the +2, 0 and −2 order beams diffracted from grating 26, or a single data information illuminating and reflected beam and its associated tracking beams, for example, the +1, 0 and −1 order beams diffracted from grating 28 originated by any of the five beams diffracted from grating 26.

Collimated beam 20 impinges upon gratings 26 and 28, producing diverging collimated beams 100, 101 and 102, which are focused by field lens 32 at focal plane 106, at a distance $f_1$ from principal plane 104 of lens 32. Beams 110, 111 and 112 pass through polarizing beam splitter 40 and quarter wavelength polarizing plate 44, and are imaged on tube lens 46, completely filling its entrance pupil 120. Tube lens 46 is positioned such that its focal length is equal to $f_2$, the distance between its principal plane 48 and plane 106.

Tube lens 48 collimates beams 110, 111 and 112 to beams having principal rays 121, 122 and 123, respectively, which beams are applied to focusing objective lens 52 which focuses beams 121, 122 and 123 to diffraction limited spots 131, 132 and 133, respectively. These illuminated spots reflect back along the same paths, become collimated beams by lens 52, and are focused by lens 46. The reflected beams pass through quarter wavelength polarizing plate 44 (for the second time) and, since they are now plane polarized 90° to the plane polarization of incident beams 110, 110 and 112, they are reflected by surface 42 of polarizing beam splitter 40. Beams 141, 142 and 143 are focused at three detector positions on surface 86 of detector array 84. The optical distance between principal plane 48 of lens 46 and surface 86 of deector array 84 (reflected at surface 42) is equal to $f_2$, the focal length of lens 46.

In the example of the present embodiment, $f_1 = 14$ mm and $f_2 = 140$ mm, thus providing a magnification of 10X between the beam diameter from lens 32 in order to fill the entrance pupil 120 of lens 46. Illustratively, beams 100, 101 and 102 have diameters of 0.65 mm and beams 121, 122 and 123 have 6.5 mm diameters. Also, by way of illustration, lens 52 has a five mm focal length and numerical aperture (NA)=0.65, and is capable of forming spots 131, 132 and 133 of 0.7 $\mu$m diameter.

Referring to FIG. 4, there is shown a typical arrangement of detector positions on surface 86 of detector 84, as well as illuminated spots reflected from surface 57 of optical tape 51. Elements 171-75 are light sensitive detector positions on surface 86 which detect data information stored on surface 57 of tape 51. Elements 176 and 177 are light sensitive detector positions on surface 86 which detect tracking information from the data stored on tape 51.

Light spots 151-55 and 160-69 are the reflections from surface 57 of tape 51 originated by the fifteen beams emerging from optical diffraction gratings 26 and 28. Specifically, light spots 151-155 are the reflections from the five 0 order beams from grating 28 (derived from the five beams generated by grating 26). Light spots 160-69 are the ten ±1 order beams from grating 28.

The instantaneous intensity of light at spots 151-55 represents the informational content of the data along five tracks on surface 57 of tape 51. The positions of the five tracks 181-85 are shown in FIG. 4 for reference. Light spots 160-69 may be used for tracking purposes, but, since the data tracks are fixed with respect to each other, only one pair, namely light spots 164 and 165, detected at detector positions 176 and 177, respectively, are actually used. The beams forming reflected spots 164 and 165 are ideally positioned to each illuminate one-half of each pit along track 183.

Typical dimensions for the elements on surface 86 of detector 84 are as follows: the diameters of optically-sensitive detector positions 171-77, 4.0 $\mu$m; the full-width, half-power sizes of spots 151-55 and 160-69, 0.7 $\mu$m; the inter-track spacings, s=1.2 $\mu$m; the width of each track, t=0.7 $\mu$m; the distance between data spots along each track, $d_1=20$ $\mu$m; and the distance, along each track, between the data spot and a corresponding tracking spot, $d_2=6.7$ $\mu$m.

Thus, the angle between the center of data spots 151-55 and the center line of tracking spots 164-65, $\alpha$, which is also the angle between the grating lines of diffraction gratings 26 and 28 (shown in FIG. 2) is $\alpha=\tan^{-1}(1.2/20)+\tan^{-1}(0.7/13.4)=6.4°$.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. A headwheel for use in a system for retrieving information stored on an information-bearing surface of an optical tape, said headwheel comprising:

support means having a generally cylindrical outer surface, said support means being rotatable about a central axis thereof;

said optical tape being helically wrapped about a portion of said support means such that said information-bearing surface is adjacent said outer surface;

means responsive to a collimated beam of light directed along said central axis for splitting said beam into a plurality of light beams;

means for directing said plurality of beams into respective diffraction limited spots on said information-bearing surface of said optical tape; and means for detecting the intensity of light reflected from said diffraction limited spots on said information-bearing surface.

2. The headwheel according to claim 1 wherein said outer surface includes a sapphire window through which said plurality of light beams are focused on said information-bearing surface of said optical tape.

3. The headwheel according to claim 1 wherein said splitting means includes a first optical diffraction grating for splitting said collimated beam of light into a plurality of light beams.

4. The headwheel according to claim 3 wherein said first optical diffraction grating splits said collimated beam of light into five beams of substantially equal intensity.

5. The headwheel according to claim 3 wherein said splitting means further includes a second optical diffraction grating for splitting each beam of said plurality of light beams into a second plurality of light beams.

6. The headwheel according to claim 5 wherein said first and second optical diffraction gratings are positioned at said central axis of said support means and are normal to said central axis.

7. The headwheel according to claim 1 wherein said detecting means includes means for detecting the focus condition of said diffraction limited spots on said information-bearing surface of said optical tape, said focus condition detecting means including means for generating a control signal to said directing means indicative of said focus condition.

8. The headwheel according to claim 1 wherein said detecting means includes means for detecting the tracking position of said diffraction limited spots on said information-bearing surface of said optical tape, said tracking position detecting means including means for generating a control signal to said directing means indicative of said tracking position.

9. A system for retrieving information stored on an information-bearing surface of an optical tape, said system comprising:

a headwheel having a generally cylindrical outer surface, said headwheel being rotatable about a central axis thereof;

said optical tape being helically wrapped around a portion of said outer surface of said headwheel such that said information-bearing surface is adjacent said outer surface;

means for providing relative motion between said headwheel and said optical tape by rotation of said headwheel about said central axis; and means for providing a collimated beam of light to said headwheel along said central axis;

said headwheel including means for splitting said collimated beam of light into a plurality of light beams;

said headwheel further including means for directing said plurality of beams into respective diffraction limited spots on said information-bearing surface of said optical tape;

said headwheel further including means for detecting the intensity of light reflected from said diffraction limited spots on said information-bearing surface.

10. The system according to claim 9 wherein said outer surface of said headwheel includes a sapphire window through which said plurality of light beams are focused on said information-bearing surface of said optical tape.

11. The system according to claim 9 wherein said splitting means includes a first optical diffraction grating for splitting said collimated beam of light into a plurality of light beams.

12. The system according to claim 11 wherein said first optical diffraction grating splits said collimated beam of light into five beams of substantially equal intensity.

13. The system according to claim 11 wherein said splitting means further includes a second optical diffraction grating for splitting each beam of said plurality of light beams into a second plurality of light beams.

14. The system according to claim 13 wherein said first and second optical diffraction gratings are positioned at said central axis of said headwheel and are normal to said central axis.

15. The system according to claim 9 wherein said detecting means includes means for detecting the focus condition of said diffraction limited spots on said information-bearing surface of said optical tape, said focus condition detecting means including means for generating a control signal to said directing means indicative of said focus condition.

16. The system according to claim 9 wherein said detecting means includes means for detecting the tracking position of said diffraction limited spots on said information-bearing surface of said optical tape, said tracking position detecting means including means for generating a control signal to said directing means indicative of said tracking position.

17. The system according to claim 9 wherein said means for providing a collimated beam of light includes a laser and a beam expander for expanding the light beam output of said laser.

18. The system according to claim 17 wherein said laser provides a light beam output at wavelength less than 650 nanometers.

* * * * *